United States Patent
Mueller

[15] 3,658,646
[45] Apr. 25, 1972

[54] FUEL ELEMENT BUNDLE FOR NUCLEAR REACTORS

[72] Inventor: Richard Arno Mueller, Neuthard, Germany

[73] Assignee: Gesellschaft Fur Kernforschung, Karlsruhe, Germany

[22] Filed: Oct. 7, 1968

[21] Appl. No.: 781,663

Related U.S. Application Data

[63] Continuation of Ser. No. 627,162, Mar. 30, 1967, abandoned.

[30] Foreign Application Priority Data

Apr. 3, 1966 Germany.................................G 46 493

[52] U.S. Cl..............................................................176/78
[51] Int. Cl.........................................................G21c 3/32
[58] Field of Search........................176/78, 76, 61, 64, 81, 83

[56] References Cited

UNITED STATES PATENTS

| 3,034,975 | 5/1962 | Beurtheret.............................176/81 X |
| 3,137,637 | 6/1964 | Elliott....................................176/83 X |
| 3,173,845 | 3/1965 | Ritz........................................176/64 X |
| 3,212,982 | 10/1965 | Astley et al. ..........................176/64 X |
| 3,257,285 | 6/1966 | Cliffor et al..........................176/61 X |
| 3,284,310 | 11/1966 | Straat...................................176/61 X |
| 3,297,544 | 1/1967 | Hooper et al. .......................176/90 X |

Primary Examiner—Benjamin R. Padgett
Assistant Examiner—Gary G. Solyst
Attorney—Burgess, Dinklage & Sprung

[57] ABSTRACT

Nuclear reactor fuel element bundle having a multiplicity of rod-type fuel elements therein surrounded by a common shroud with coolant within the shroud surrounding the rods wherein the fuel elements are so constructed as to have eccentric portions which provide at least one helical path which offers lesser resistance to the flow of coolant therethrough among the rods.

4 Claims, 5 Drawing Figures

Patented April 25, 1972 3,658,646

INVENTOR:
RICHARD ARNO MUELLER
BY: Burgess, Dinklage & Sprung
ATTORNEYS

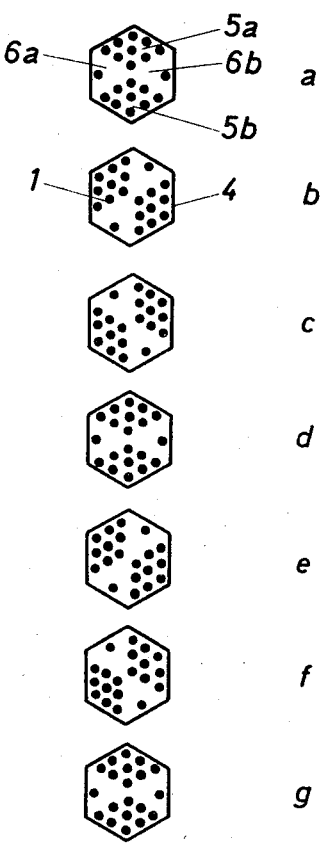

Patented April 25, 1972

INVENTOR:
RICHARD ARNO MUELLER
BY: Burgess, Dinklage & Sprung
ATTORNEYS

FUEL ELEMENT BUNDLE FOR NUCLEAR REACTORS

This application is a continuation of U.S. Pat. application No. 627,162, filed Mar. 30, 1967, now abandoned.

The invention relates to a fuel element bundle for nuclear reactors with a multiplicity of rod-type fuel elements surrounded by a common shroud tube conducting the coolant.

The heat release of a nuclear reactor, which is diminished towards the marginal areas because a lower fission rate relative to the center of the core, is mostly balanced out with respect to the coolant heatup by throttling the coolant flow in these fuel element bundles correspondingly.

This heat release decreasing towards the outside, however, in addition makes itself felt in the individual fuel element bundle so that, e.g., the side walls of the canning tube show different temperatures. This, however, may result in undesired distortion of the whole fuel element bundle or - if the thermal elongation is inhibited, e.g., by guide pieces or stops - in considerable stresses on the material. In order to remove this distortion and decrease the thermal stresses respectively, it has been suggested already to surround the fuel element bundle with another cladding at some distance and feed part of the coolant through the annular space thus formed, with flow guides forcing a horizontal component upon the coolant flow to balance differential side wall temperatures (report APDA - 128, p. 21).

However, this measure requires additional design expenditure and, in addition, reduces the specific volume power of the reactor.

The invention is based on the problem of improving a fuel element bundle of the type described last above by simple design efforts so as to retain the specific volume power to the largest extent possible.

In the invention, this problem is solved in the way that the fuel element bundle, as viewed over the cross section of the canning tube, has sectors of differential flow resistance which have helical extension relative to the axis of the fuel element bundle. These sectors can be formed simply by providing different distances between the fuel elements which, e.g., are provided along the common axis of the fuel element bundle. Because of their small cross section the fuel elements can follow these deformations quite well during the assembly. The canning tube does not require any additional design measures. Due to the helical extension of the sectors and the coolant pressure always balancing out at all horizontal levels the result is a helical flow of coolant through the fuel element bundle, which permits temperature equalization, thus avoiding as much as possible deformations and stresses, respectively.

By way of example, details of the invention are explained on the basis of the drawings.

FIG. 2a–2g show several cross sections corresponding to the lines a–a to g–g in FIG. 1

Figure 1:
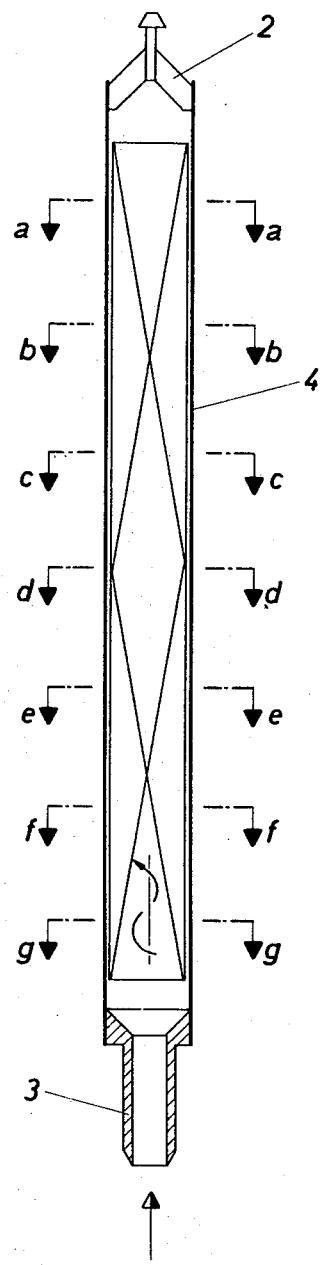
FIG. 1 shows a schematical longitudinal section through the fuel element bundle

As is evident from FIGS. 1 and 2, the fuel element bundle consists of a multitude of rod-type fuel elements 1 which are surrounded by a hexagonal canning tube 4 carrying a head 2 and a foot 3. Each fuel element assembly cross section is subdivided into four sections 5a, 5b, 6a and 6b. Two symmetrically opposed sectors 5a, 5b of high flow resistance are formed by fuel elements arranged at a small distance from each other, while the two other sectors 6a, 6b of low flow resistance have fuel elements arranged at 3 large distance from each other or no fuel elements at all.

Figure 3A:
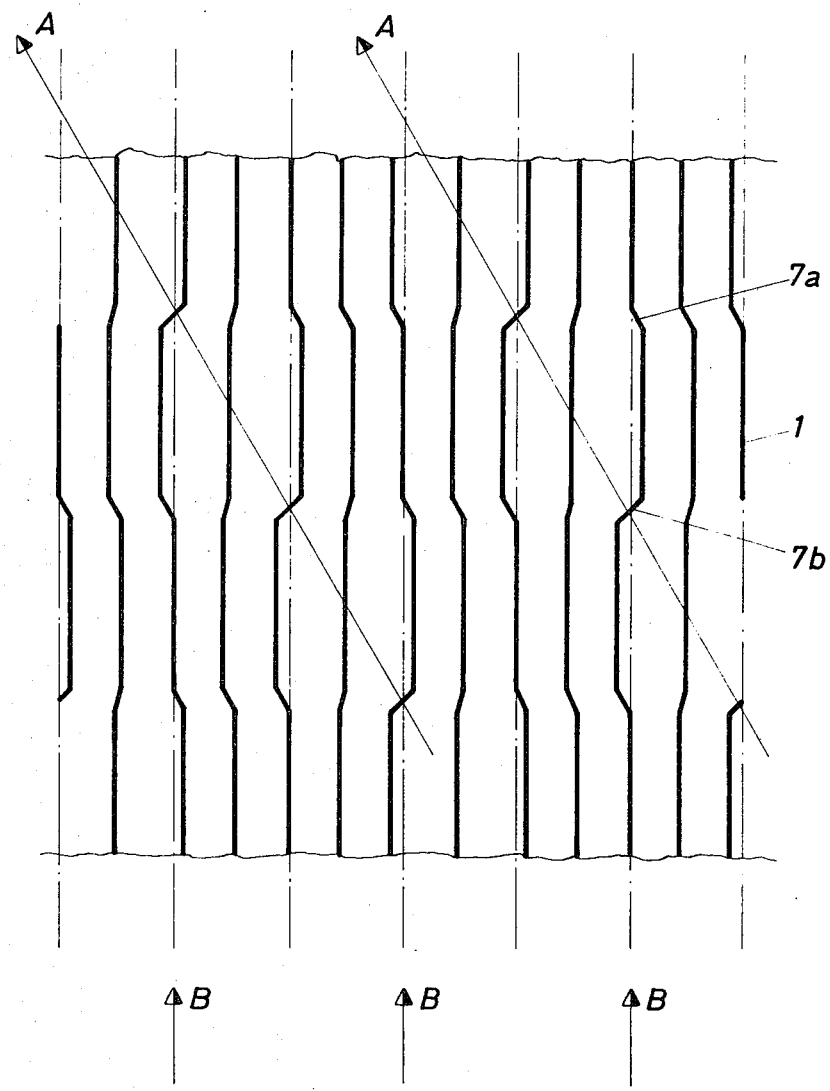
FIG. 3a and 3b are a detail each of a developed shell of a fuel element bundle with offset fuel elements

Each rod-type fuel element contains eccentric portions, shown in FIG. 3a between 7a and 7b. These eccentric portions are disposed about the axis of the fuel rod element in a periodic repetitious fashion. It will be seen as one proceeds from the center of the bundle of fuel rod elements toward the peripheral areas adjacent to the shroud, that the eccentricity increases so as to produce alternating paths of high and low flow resistance extending as steps roughly in the direction of the arrows A of FIG. 3a.

Figure 3B:
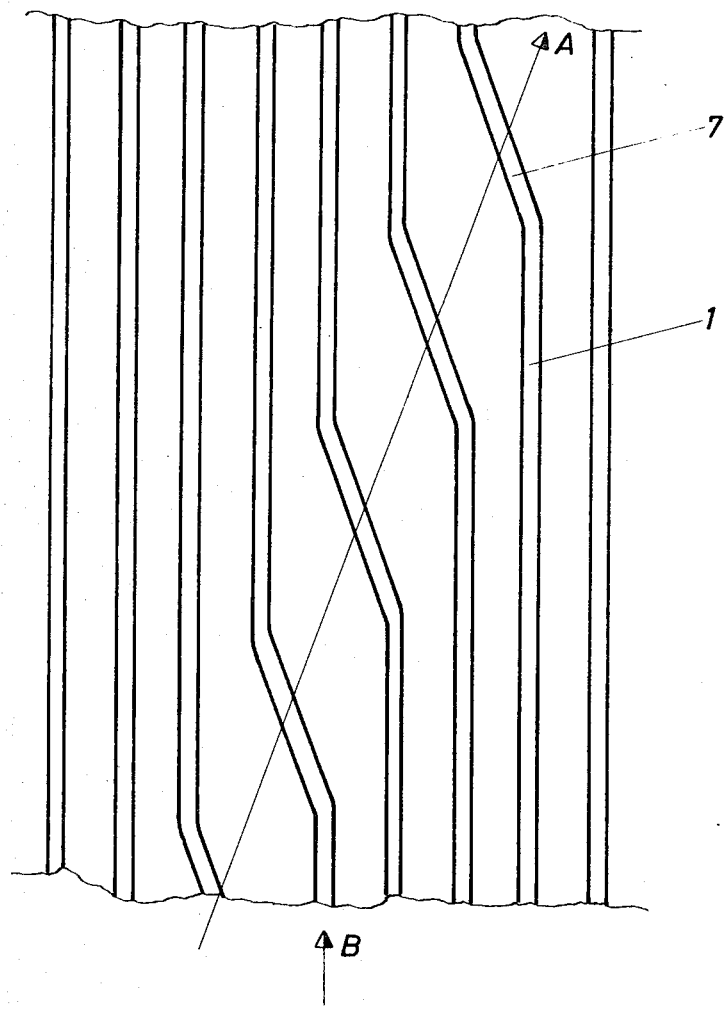

FIG. 3b shows a particular configuration of fuel elements 1 having offset portions 7 disposed in a given location and in a given sequence so as to establish a path A of decreased flow resistance to coolant as compared to the resistance to the flow of coolant generally existant between adjacent fuel rods 1.

It should be noted that the fuel rods have a generally common cross-section, regardless of whether the eccentric or non-eccentric portions thereof are considered, and that those portions of the fuel rods which are not eccentric have axes which are to be considered coincidental with the axis of the fuel rod element itself, whereas the axes of the eccentric portions are offset with respect to the axis of the fuel rod element of which the eccentric portion is a part.

The helically extending circular sectors of low flow resistance thus formed extend more or less in the direction of the arrows A if the respective fuel element bundle is met by the flow of the coolant in the direction B of the arrow.

Figure 4:
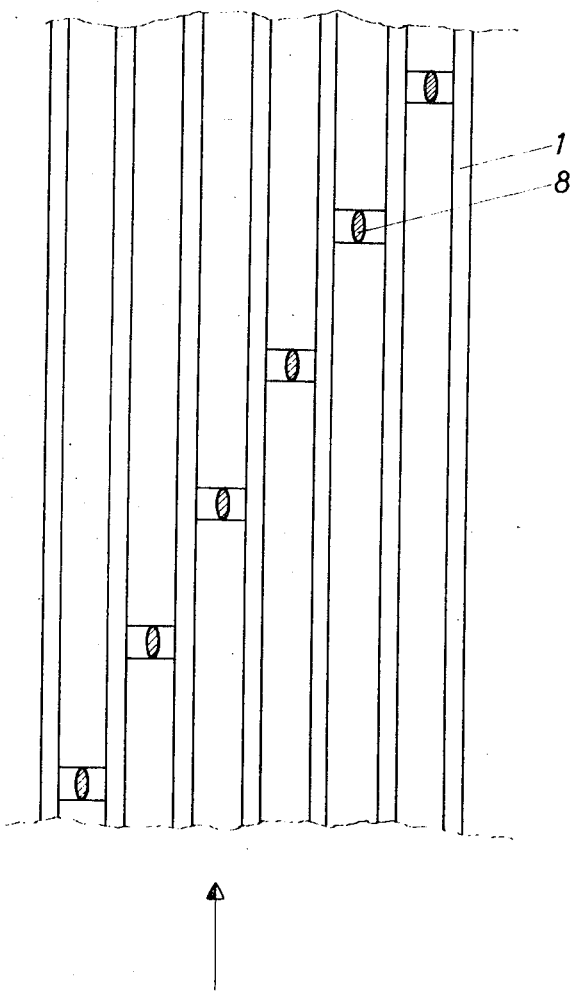
FIG. 4 is a detail of a shell of a fuel element bundle in which flow resistance bodies have been inserted between the individual fuel elements.

In the example shown in FIG. 4, flow resistances 8 which at the same time act as fuel element spacers are installed between two adjacent fuel elements 1 each in preset stages.

The invention is not restricted to fuel element bundles with rod-type fuel elements. It is credible, e.g., that fuel spheres of different diameters could be introduced into the canning tube in such a way that this would form helically circulating sectors of different flow resistances.

What we claim is:

1. A fuel element assembly for use in a nuclear reactor comprising a plurality of fuel rod elements, each of which comprises a multiplicity of portions of substantially common cross-section; a common shroud surrounding all of such rods; and means for passing coolant through said assembly, wherein at least one of said portions of each fuel rod element has an axis coincident with the axis of said fuel rod elements, wherein at least one other of said portions of each fuel rod element is eccentric and has an axis which is offset with respect to the axis of said fuel rod, and wherein said eccentric portions of adjacent fuel rods define at least one helix, wherein said helices establish and define a path of lesser flow resistance to the passage of coolant therethrough as compared to the resistance of the passage of coolant by other spaces between adjacent fuel rod elements.

2. A fuel element assembly as claimed in claim 1, wherein said eccentric portions are disposed periodically about said fuel rod element axis and wherein the eccentricity of said eccentric portions increases on the fuel rod elements in the direction toward said shroud.

3. A fuel element assembly as claimed in claim 1, wherein said eccentric portions define a path of increased flow-resistance, as well as said path of decreased flow resistance in sequence.

4. A fuel element assembly as claimed in claim 3, including a multiplicity of paths of substantially equal resistance to the flow of coolant, which paths oppose each other in a symmetrical pattern.

* * * * *

UNITED STATES PATENT OFFICE
CERTIFICATE OF CORRECTION

Patent No. 3,658,646           Dated April 25, 1972

Inventor(s) Richard Arno Mueller

It is certified that error appears in the above-identified patent and that said Letters Patent are hereby corrected as shown below:

Foreign Application Priority Data has

"April 3, 1966" and should be -- April 2, 1966 --.

Signed and sealed this 2nd day of January 1973.

(SEAL)
Attest:

EDWARD M. FLETCHER, JR.
Attesting Officer

ROBERT GOTTSCHALK
Commissioner of Patents